(12) United States Patent  (10) Patent No.: US 8,111,415 B2
Maebashi  (45) Date of Patent: Feb. 7, 2012

(54) IMAGE FORMING APPARATUS AND METHOD OF CONTROLLING THE SAME TO CORRECT IMAGE FORMING POSITION IN AN AMOUNT SMALLER THAN ONE PIXEL

(75) Inventor: Yoichiro Maebashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 960 days.

(21) Appl. No.: 12/039,148

(22) Filed: Feb. 28, 2008

(65) Prior Publication Data

US 2008/0218786 A1  Sep. 11, 2008

(30) Foreign Application Priority Data

Mar. 6, 2007  (JP) ................................. 2007-056374

(51) Int. Cl.
  *G06F 3/12* (2006.01)
(52) U.S. Cl. ....... 358/1.15; 347/122; 347/131; 347/135; 347/240; 358/1.5; 358/1.7; 358/2.1; 358/3.1
(58) Field of Classification Search .......... 358/1.1–3.23; 399/46, 316
See application file for complete search history.

(56) References Cited

U.S. PATENT DOCUMENTS

| 6,836,625 | B2 | 12/2004 | Shiratori | |
|---|---|---|---|---|
| 6,898,381 | B2 | 5/2005 | Maebashi et al. | 399/15 |
| 7,097,270 | B2 | 8/2006 | Yamazaki | 347/19 |
| 7,239,427 | B2 | 7/2007 | Tezuka et al. | 358/2.1 |
| 7,269,369 | B2 | 9/2007 | Tezuka et al. | 399/72 |
| 2004/0253013 | A1* | 12/2004 | Furukawa | 399/49 |
| 2005/0206980 | A1* | 9/2005 | Nishikawa et al. | 358/518 |
| 2005/0248789 | A1 | 11/2005 | Kita et al. | 358/1.9 |
| 2005/0260004 | A1 | 11/2005 | Maebashi et al. | 399/15 |
| 2006/0226338 | A1* | 10/2006 | Tojima et al. | 250/208.1 |

FOREIGN PATENT DOCUMENTS

| CN | 1480796 | 3/2004 |
|---|---|---|
| JP | 2002-116394 | 4/2002 |
| JP | 2003-241131 | 8/2003 |
| JP | 2004-170755 | 6/2004 |
| JP | 2006-297631 | 11/2006 |

OTHER PUBLICATIONS

Chinese Office Action dated Jul. 24, 2009 in CN 200810085215.2.

* cited by examiner

*Primary Examiner* — Benny Tieu
*Assistant Examiner* — Marcellus Augustin
(74) *Attorney, Agent, or Firm* — Fitzpatrick, Cella, Harper & Scinto

(57) ABSTRACT

An image forming apparatus of this invention includes an image forming position correction unit which corrects an inclination or curve of an image in the main scanning direction by converting coordinates designating pixel positions of a bitmap image in the sub-scanning direction. It is discriminated whether image formation is normal image formation or formation of the toner image for detection by an image forming condition correction unit. Based on the discrimination result, the image forming apparatus is controlled so as to correct the image forming position by using the image forming position correction unit in a case in which the image formation is discriminated as the normal image formation, but so as not to correct the image forming position by using the image forming position correction unit in a case in which the image formation is discriminated as formation of the toner image for detection.

12 Claims, 14 Drawing Sheets

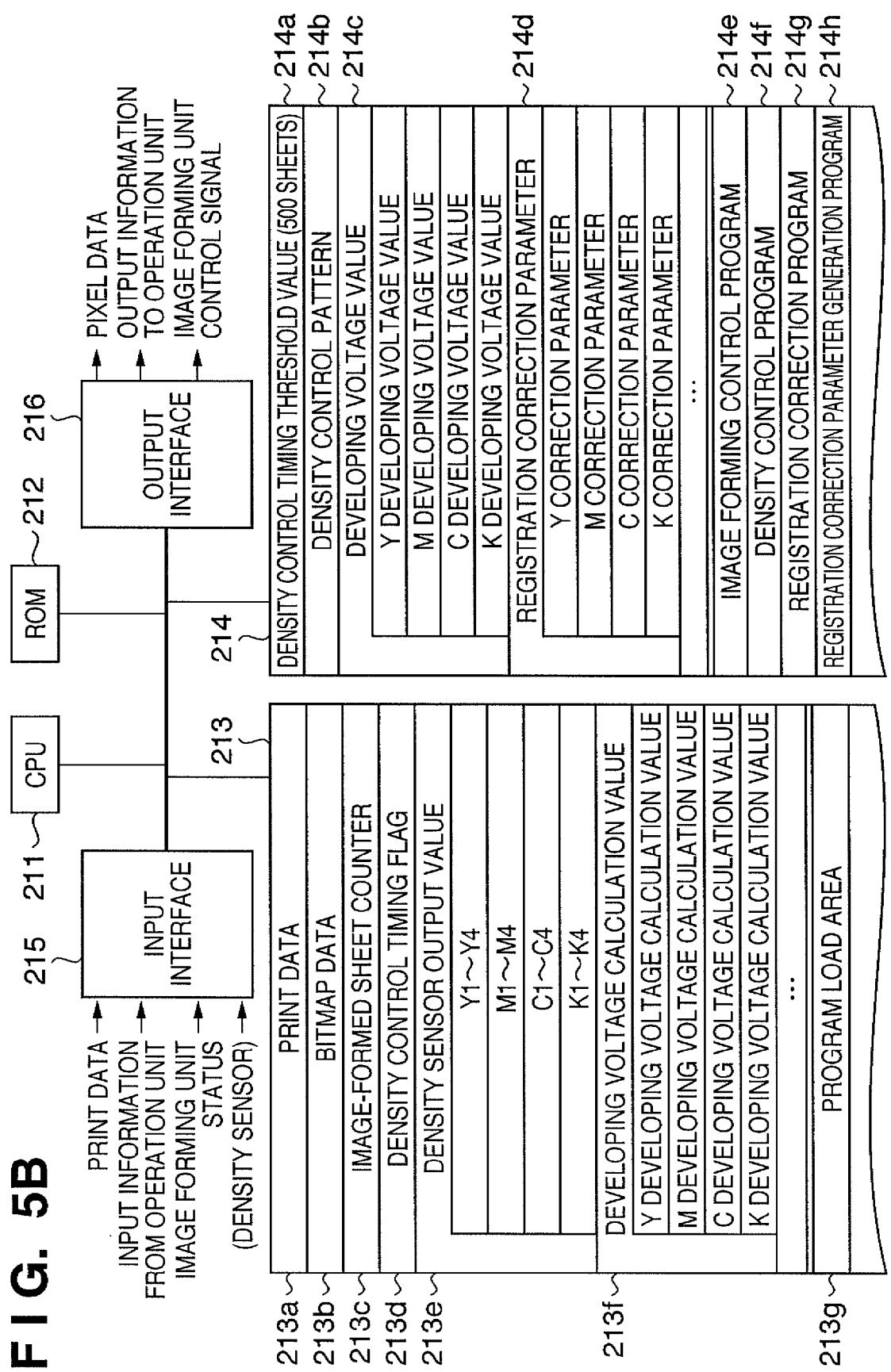

IMAGE FORMING APPARATUS AND METHOD OF CONTROLLING THE SAME TO CORRECT IMAGE FORMING POSITION IN AN AMOUNT SMALLER THAN ONE PIXEL

BACKGROUND OF THE INVENTION

1. Field of the Invention

The present invention relates to an image forming apparatus and a method of controlling the same. More particularly, the present invention relates to an electrophotographic image forming apparatus such as a printer and a color copying machine, and a method of controlling the same.

2. Description of the Related Art

Tandem color image forming apparatuses are recently growing in number, each of which includes developing units and photosensitive drums equal in number to color materials and sequentially transfers images of different colors onto an image conveyance belt or a printing medium, thereby increasing the image forming speed in the electrophotographic color image forming apparatus. The tandem color image forming apparatus has a plurality of factors to cause registration errors, as is already known, and various measures have been proposed for the respective factors.

One of the factors is the nonuniformity or a position error of the lens in an optical scanning apparatus, or an assembly position error of the optical scanning apparatus to the color image forming apparatus. This inclines or curves the scanning lines. Since the degree of inclination or curve changes between the colors, a registration error occurs.

Japanese Patent Laid-Open No. 2002-116394 describes the following measure for such a registration error. First, in the process of assembling the optical scanning apparatus, the magnitude of the curve of the scanning lines is measured by using an optical sensor. The lens is mechanically rotated to adjust the curve of the scanning lines, and then fixed by an adhesive.

Japanese Patent Laid-Open No. 2003-241131 describes the following method. First, in the process of assembling the optical scanning apparatus to the color image forming apparatus main body, the magnitude of the inclination of the scanning lines is measured by using an optical sensor. The optical scanning apparatus is mechanically inclined to adjust the inclination of the scanning lines, and then assembled to the color image forming apparatus main body.

Japanese Patent Laid-Open No. 2004-170755 describes the following method. First, the magnitudes of the inclination and curve of the scanning lines are measured by using an optical sensor. Bitmap image data is corrected to cancel the inclination and curve, and a corrected image is formed. This method electrically corrects the inclination and curve by processing image data without using any mechanical adjusting members or adjustment process in assembly. It is therefore possible to cope with the registration error at a lower cost than the methods described in Japanese Patent Laid-Open Nos. 2002-116394 and 2003-241131.

This electrical registration error correction is divided into pixel-by-pixel correction and correction in an amount smaller than a pixel. In pixel-by-pixel correction, each pixel is offset in the sub-scanning direction in accordance with the inclination and curve correction amounts. In correction in an amount smaller than a pixel, the tone value of bitmap image data is corrected in the preceding and subsequent pixels in the sub-scanning direction. The correction in an amount smaller than a pixel eliminates unnatural steps at the offset boundary caused by the pixel-by-pixel correction and smoothens the image.

However, registration error correction using the method of Japanese Patent Laid-Open No. 2004-170755 can cause an uneven density in a high density image.

The uneven density in a high density image will be described with reference to FIG. 13. An input image 501 is a thin line of 1 dot. An image 502 obtained by executing correction of out of color registration for the input image 501 is actually formed. Although the input image 501 is a thin line image with a uniform density, the output image after correction of out of color registration is a thin line image with an uneven density 503. This is because a general electrophotographic image forming apparatus is not good at forming isolated pixels while maintaining the proportional relationship between the image tone value and the actual image density value. In a high density image including such a thin line, this effect comes to the fore as an uneven density.

On the other hand, an image forming apparatus using an electrophotographic image forming process readily causes an image density fluctuation depending on conditions such as the use environment and the number of printed sheets. Especially, in a color image forming apparatus for executing color printing by superimposing toner images of a plurality of colors, when the image density of each color fluctuates, the color balance (so-called tint) fluctuates. It is therefore important to suppress the density fluctuation.

Many recent color image forming apparatuses obtain a stable image by controlling the image density. For example, a toner image for detection (to be referred to as a toner patch hereinafter) is formed as a test image on an image carrier such as a photosensitive body or an intermediate transfer member or on a transfer material carrier such as a transfer belt. An optical sensor detects the toner amount of the toner patch. The detection result is fed back to the exposure amount, developing bias, and the like, thereby controlling the image density.

The toner image for detection to be used for the image density control preferably uses a pattern that sensitively changes the density in response to the factors of density fluctuation. In many cases, a high density pattern including a larger number of pattern lines than a pattern for normal image formation for image formation on a printing medium fed from a feed tray is used.

Hence, when the above-described correction of out of color registration is performed, an uneven density may occur in the toner image pattern for detection used for image density control. Needless to say, if the toner image for detection used for image density control has an uneven density, the result of image density control becomes unstable, and consequently, the image density of a printed image fluctuates.

It is an object of the present invention to prevent fluctuations of the density of a formed image by stabilizing the result of image density control in an image forming apparatus for executing electrical registration error correction.

SUMMARY OF THE INVENTION

Embodiments of the present invention are provided to overcome the above-described drawbacks of the related technology.

According to an aspect of the present invention, there is provided an image forming apparatus including an image forming position correction unit adapted to correct an inclination or curve of an image in a main scanning direction by converting coordinates designating pixel positions of a bitmap image in a sub-scanning direction, and an image forming condition correction unit adapted to form a toner image for detection on an image carrier, cause an optical sensor to detect an amount of light reflected by the toner image for detection, and determine an image forming condition on the basis of a detection result of the optical sensor, the apparatus comprising a discriminator adapted to discriminate whether image formation is normal image formation for image formation on a printing medium fed from a feed tray or image formation of the toner image for detection by the image forming condition correction unit, and a controller adapted to control the image forming apparatus so as to correct an image forming position by using the image forming position correction unit in a case in which the discriminator has discriminated that the image formation is the normal image formation, but so as not to correct the image forming position by using the image forming position correction unit in a case in which the discriminator has discriminated that the image formation is of the toner image for detection.

According to another aspect of the present invention, there is provided a method of controlling an image forming apparatus including an image forming position correction unit adapted to correct an inclination or curve of an image in a main scanning direction by converting coordinates designating pixel positions of a bitmap image in a sub-scanning direction, and an image forming condition correction unit adapted to form a toner image for detection on an image carrier, cause an optical sensor to detect an amount of light reflected by the toner image for detection, and determine an image forming condition on the basis of a detection result of the optical sensor, the method comprising the steps of discriminating whether image formation is normal image formation for image formation on a printing medium fed from a feed tray or image formation of the toner image for detection by the image forming condition correction unit, and controlling the image forming apparatus so as to correct an image forming position by using the image forming position correction unit in a case in which the image formation is discriminated as the normal image formation in the discriminating step, but so as not to correct the image forming position by using the image forming position correction unit in a case in which the image formation is discriminated as formation of the toner image for detection in the discrimination step.

Further features of the present invention will become apparent from the following description of exemplary embodiments (with reference to the attached drawings).

BRIEF DESCRIPTION OF THE DRAWINGS

FIG. 5B is a block diagram showing an example of the hardware configuration of the image processing unit of the image forming apparatus according to the embodiment;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

In the following embodiments, density control and, more particularly, control of a developing voltage value will be exemplified as an image forming condition. However, the present invention is not limited to this. More specifically, the present invention is applicable to setting of an image forming condition affected by electrical registration error correction or control of another correction process that affects setting of an image forming condition. The present invention also incorporates them.

First Embodiment

In this embodiment, when a toner image for detection to be used for image density control is to be formed, electrical registration error correction is inhibited. A method of stabilizing the result of image density control and preventing fluctuations of the density of a printed image in this way will be described.

Example of Basic Arrangement of Image Forming Apparatus of Embodiment

Figure 1:
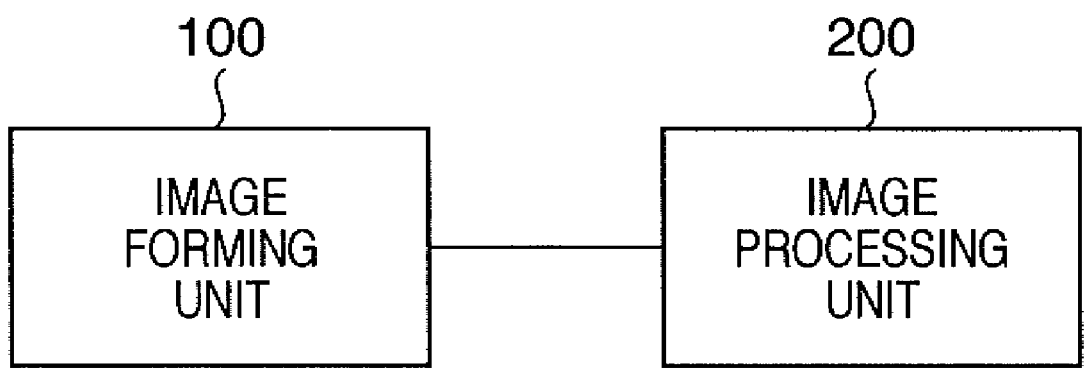
FIG. 1 is a block diagram showing an example of the basic arrangement of an image forming apparatus according to the embodiment.

FIG. 1 is a block diagram for explaining the basic arrangement of an image forming apparatus according to this embodiment.

The image forming apparatus of this embodiment includes an image forming unit 100 (to be described later) and an image processing unit 200 such as a printer controller. The image forming apparatus of this embodiment has an image forming position correction unit which corrects an inclination or curve of an image in the main scanning direction by converting a coordinate designating the position of a bitmap image in the sub-scanning direction. The image forming apparatus also has an image forming condition correction unit which forms a toner image for detection on an image carrier, causes an optical sensor to detect the amount of light reflected by the toner image for detection, and determines an image forming condition on the basis of the detection result.

Example of Arrangement of Image Forming Unit 100

Figure 2:
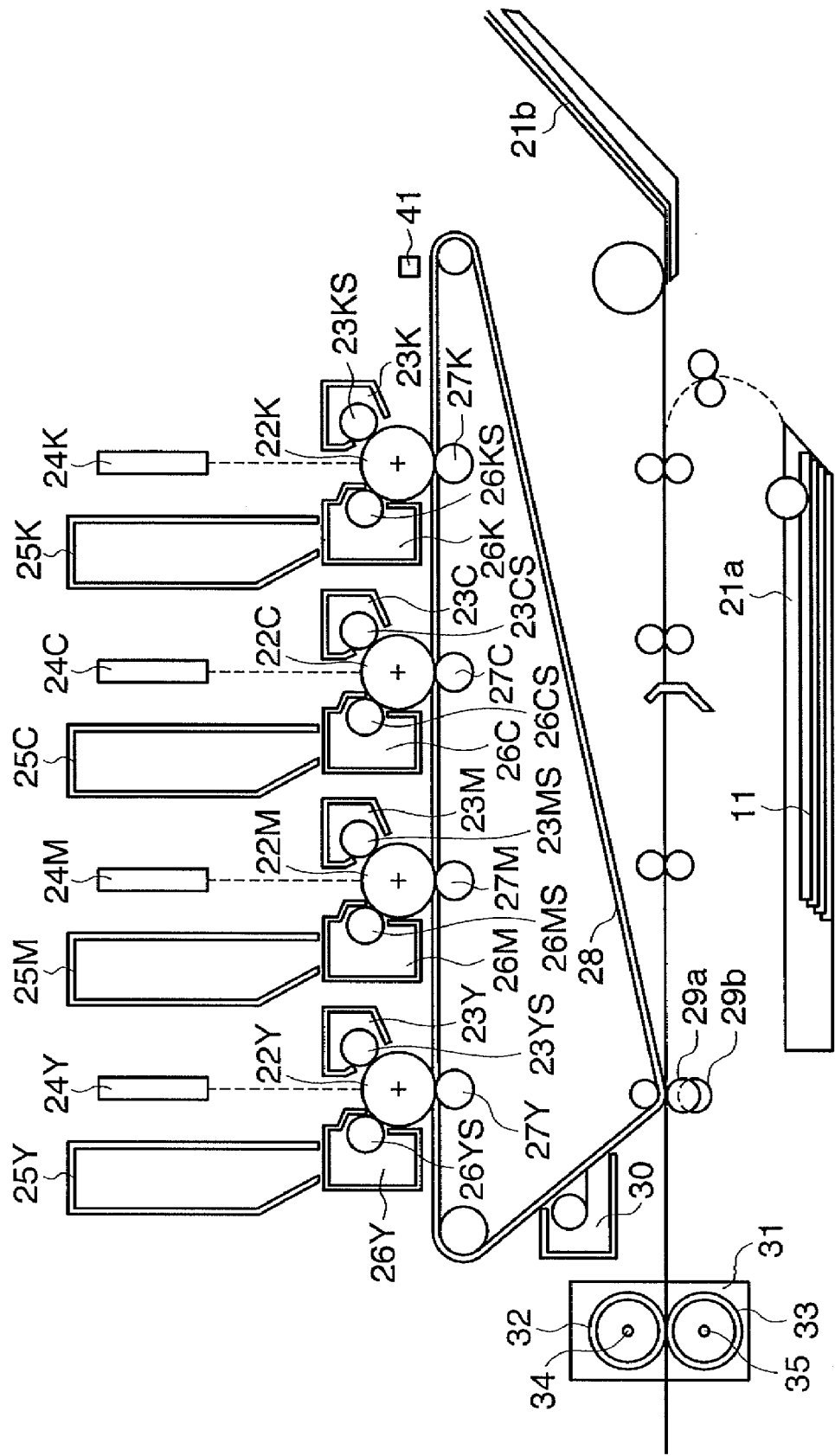
FIG. 2 is a sectional view of the image forming unit of the image forming apparatus according to the embodiment.

FIG. 2 is a sectional view showing an example of the image forming unit 100 of the image forming apparatus according to the embodiment.

The image forming apparatus of this embodiment is an electrographic color image forming apparatus. The apparatus is also a tandem color image forming apparatus that employs an intermediate transfer member 28. The operation of the image forming unit will be described below.

The image forming unit 100 drives exposure light in accordance with an exposure time processed by the image processing unit 200, thereby forming an electrostatic latent image. The image forming unit 100 develops the electrostatic latent image to form a single-color toner image and superimposes the single-color toner images to form a multicolor toner image. The multicolor toner image is transferred to and fixed on a printing medium 11.

A charge unit includes four injection chargers 23Y, 23M, 23C, and 23K which charge photosensitive members 22Y, 22M, 22C, and 22K in the stations of yellow (Y), magenta (M), cyan (C), and black (K). The injection chargers include sleeves 23YS, 23MS, 23CS, and 23KS, respectively.

Each of the photosensitive members 22Y, 22M, 22C, and 22K is formed by applying an organic photoconductive layer to the outer peripheral surface of an aluminum cylinder. The photosensitive members rotate upon receiving the driving force of a drive motor (not shown). The drive motor rotates the photosensitive members 22Y, 22M, 22C, and 22K counterclockwise in accordance with an image forming operation.

An exposure unit is designed to cause scanner units 24Y, 24M, 24C, and 24K to irradiate the photosensitive members 22Y, 22M, 22C, and 22K with exposure light, and selectively expose the surfaces of the photosensitive members 22Y, 22M, 22C, and 22K, thereby forming electrostatic latent images.

A developing unit includes four developers 26Y, 26M, 26C, and 26K which develop yellow (Y), magenta (M), cyan (C), and black (K) in the stations to visualize the electrostatic latent images. The developers include sleeves 26YS, 26MS, 26CS, and 26KS, respectively. Each developer 26 is detachable.

A transfer unit transfers single-color toner images from photosensitive members 22 to the intermediate transfer member 28. To do this, the transfer unit rotates the intermediate transfer member 28 clockwise and transfers the single-color toner images as the photosensitive members 22Y, 22M, 22C, and 22K and primary transfer rollers 27Y, 27M, 27C, and 27K opposing them rotate. When a primary transfer voltage is applied to primary transfer rollers 27, and the photosensitive members 22 and intermediate transfer member 28 are rotated at different speeds, the single-color toner images are efficiently transferred to the intermediate transfer member 28. This is called primary transfer.

The transfer unit also superimposes the single-color toner images on the intermediate transfer member 28 for the respective stations and conveys the superimposed multicolor toner image to a secondary transfer roller 29 as the intermediate transfer member 28 rotates. The printing medium 11 is clamped and conveyed from a feed tray 21 to the secondary transfer roller 29. The multicolor toner image on the intermediate transfer member 28 is transferred to the printing medium 11. A secondary transfer voltage is applied to the secondary transfer roller 29 to transfer the toner image electrostatically. This is called secondary transfer. The secondary transfer roller 29 comes into contact with the printing medium 11 at a position 29a during multicolor toner image transfer to the printing medium 11 and retreats to a position 29b after a print process.

A fixing unit fuses and fixes the multicolor toner image transferred to the printing medium 11. For this purpose, the fixing unit includes a fixing roller 32 for heating the printing medium 11, and a pressure roller 33 for pressing the printing medium 11 against the fixing roller 32. The fixing roller 32 and pressure roller 33 are hollow and incorporate heaters 34 and 35, respectively. A fixing unit 31 conveys the printing medium 11 that holds the multicolor toner image by the fixing roller 32 and pressure roller 33, and applies heat and pressure to fix the toner image to the printing medium 11.

A discharge roller (not shown) discharges the printing medium 11 after toner fixing to a discharge tray (not shown), thereby ending the image forming operation.

A cleaning unit 30 cleans residual toners on the intermediate transfer member 28. The toners that remain after the four-color toner image formed on the intermediate transfer member 28 is transferred to the printing medium 11 are collected and stored in a cleaner container.

A density sensor 41 is arranged at a position opposing the intermediate transfer member 28 and detects the density of a toner patch 64 for detection formed on the intermediate transfer member 28.

Example of Arrangement of Density Sensor 41

Figure 3:
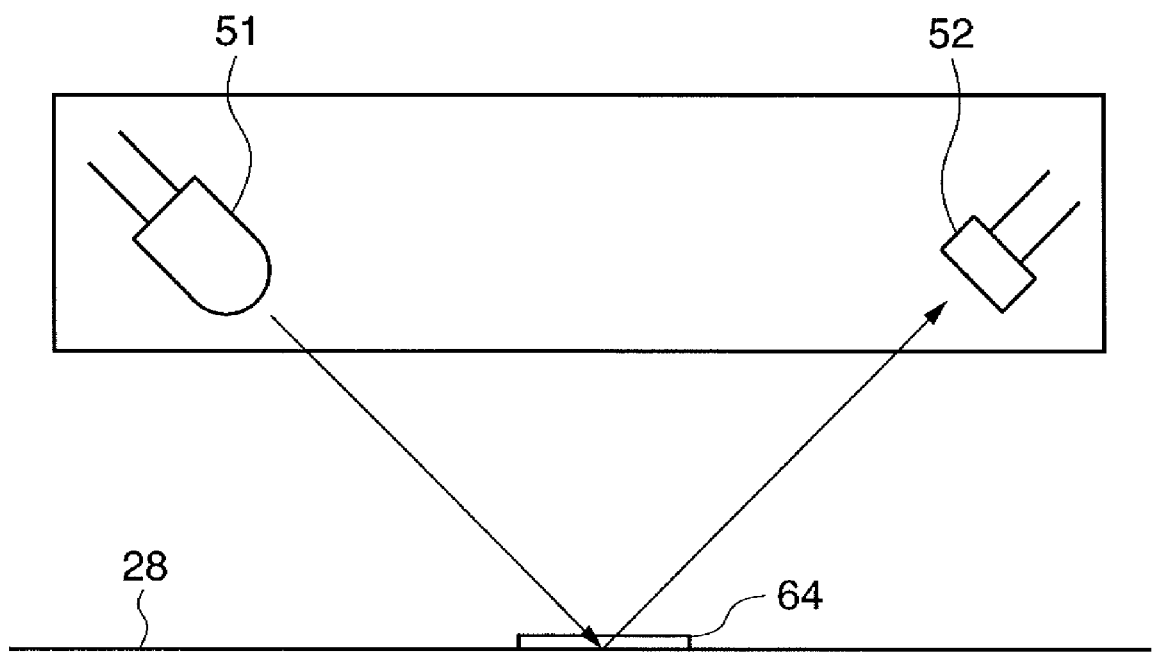
FIG. 3 is a view showing an example of the arrangement of a density sensor according to the embodiment.

FIG. 3 is a view for explaining an example of the arrangement of the density sensor 41 that is formed from an optical sensor.

The density sensor 41 includes an infrared light-emitting element 51 such as an LED, a light-receiving element 52 such as a photodiode, an IC (not shown) which processes received light data, and a holder (not shown) which accommodates these elements. The light-receiving element 52 detects the intensity of light reflected by the toner patch 64. The density sensor 41 of this embodiment detects specular reflected light. However, the density detection method is not limited to this, and diffused reflected light may be detected. An optical element such as a lens (not shown) is sometimes used to couple the infrared light-emitting element 51 with the light-receiving element 52.

In this embodiment, the intermediate transfer member 28 is a single-layer resin belt of polyimide. A proper amount of fine carbon particles are dispersed in the resin to adjust the resistance of the belt. The surface color is black. The surface of the intermediate transfer member 28 has a smoothness and gloss.

When the surface of the intermediate transfer member 28 is exposed (toner amount is 0), the light-receiving element 52 of the density sensor 41 detects reflected light. This is because the surface of the intermediate transfer member 28 has a gloss, as described above. On the other hand, when a toner image is formed on the intermediate transfer member 28, the specular reflection output gradually decreases as the density (toner amount) of the toner patch 64 increases. This is because the toner covers the surfaces of the intermediate transfer member 28, and the amount of specular reflected light from the belt surface decreases.

Figure 4:
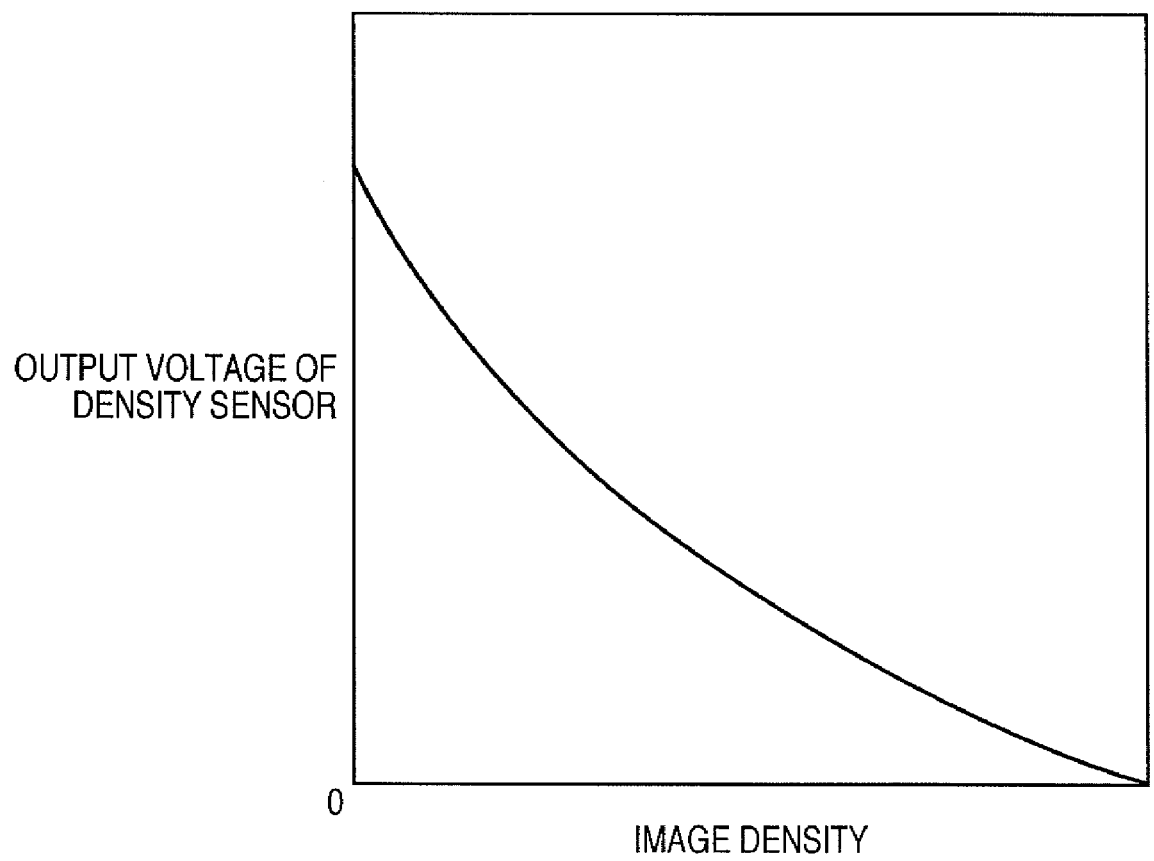
FIG. 4 is a graph showing an example of the characteristic of the density sensor according to the embodiment.

FIG. 4 is a graph showing an example of the relationship between the toner amount and the detection value (voltage) of the density sensor 41.

Referring to FIG. 4, the ordinate represents the output voltage of the density sensor, and the abscissa represents the image density (corresponding to the toner amount). The density of the toner patch is detected by converting the output voltage value of the density sensor into a density value in accordance with the relationship shown in FIG. 4.

Example of Arrangement of Image Processing Unit
200

Figure 5A:
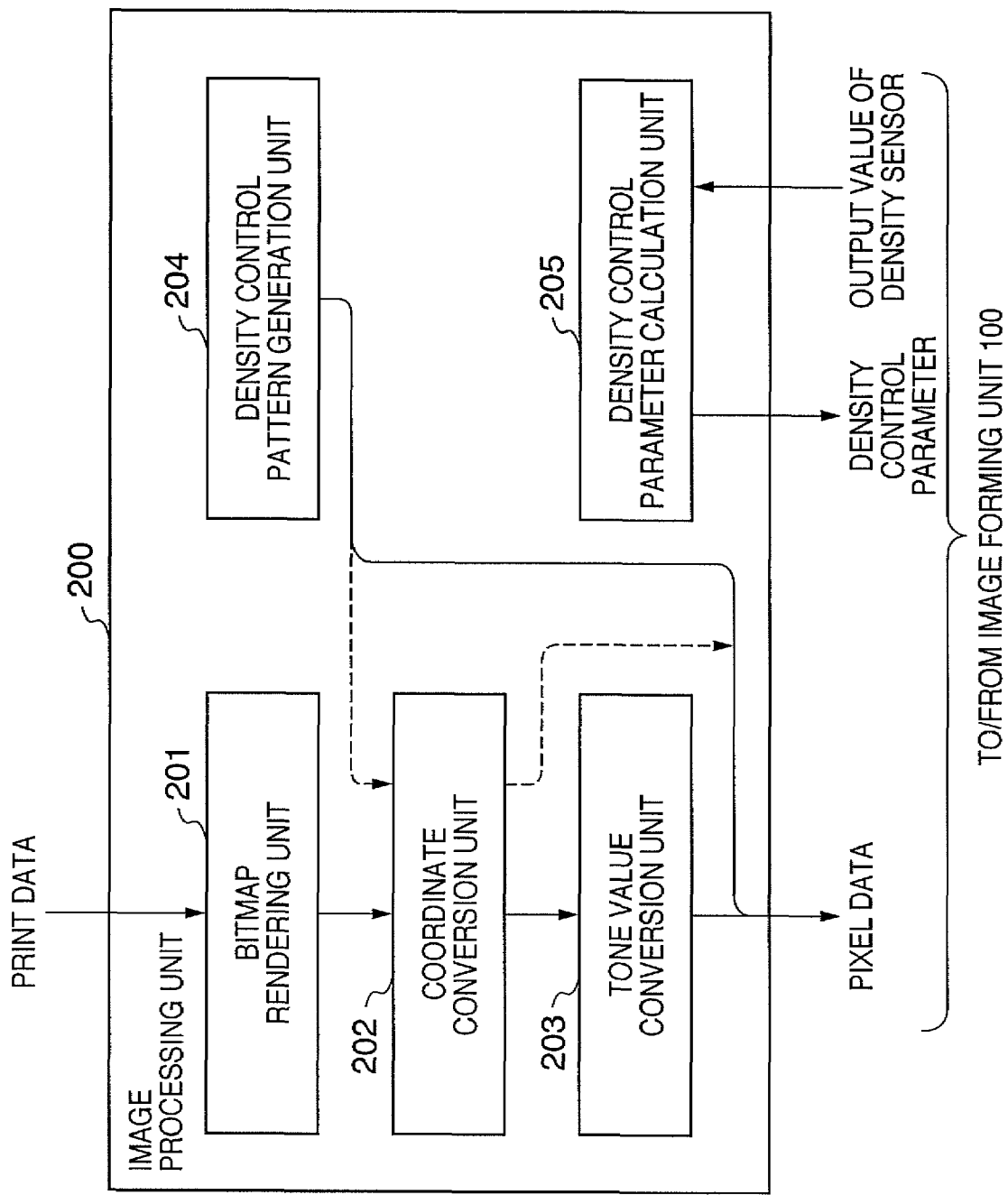
FIG. 5A is a block diagram showing an example of the functional arrangement of the image processing unit of the image forming apparatus according to the embodiment.

FIG. 5A is a block diagram showing an example of the functional arrangement of the image processing unit 200 according to the embodiment. FIG. 5A also shows an arrangement according to the second embodiment to be described later.

Referring to FIG. 5A, a bitmap rendering unit 201 executes bitmap rendering of print data. A coordinate conversion unit 202 executes pixel-by-pixel image position correction in the sub-scanning direction. A tone value conversion unit 203 executes image position correction in an amount smaller than a pixel in the sub-scanning direction. The coordinate conversion unit 202 and tone value conversion unit 203 correspond to the image forming position correction unit which executes the registration error correction of the embodiment. The registration error correction will be described later in detail.

Referring to FIG. 5A, a density control pattern generation unit 204 generates a pattern for density control (for toner patch printing). The density control pattern generation unit 204 can be a pattern storage unit. A density control parameter calculation unit 205 acquires, as an output value from the density sensor 41, the density of the pattern which is generated by the density control pattern generation unit 204 and formed on the intermediate transfer member and calculates a density control parameter (in this example, a developing voltage value). The calculated density control parameter is transferred to the image forming unit 100 to set an image forming condition.

The process of outputting the output from the density control pattern generation unit 204 to the image forming unit 100 without registration error correction by the coordinate conversion unit 202 and tone value conversion unit 203, which is indicated by the solid line in FIG. 5A, corresponds to the process of the first embodiment. On the other hand, the process of outputting the output from the density control pattern generation unit 204 to the image forming unit 100 with only registration error correction by the coordinate conversion unit 202, which is indicated by the broken line, corresponds to the process of the second embodiment.

FIG. 5B is a block diagram showing an example of the hardware configuration of the image processing unit 200 according to the embodiment. FIG. 5B illustrates only components related to the embodiment.

Referring to FIG. 5B, a CPU 211 for arithmetic control controls the image processing unit 200, and also controls the image forming unit 100 via an interface. A ROM 212 stores programs and parameters to be used by the CPU 211 in initial starting. A RAM 213 is a temporary memory used by the CPU 211 during execution of a computer program. An external storage unit 214 such as a disk or CD stores nonvolatile data or programs.

The following storage areas are allocated in the RAM 213 to implement the embodiment.

Print data 213a is data for printing which is input to the image forming apparatus. Bitmap data 213b is data obtained by bitmap rendering of the print data 213a. If bitmap data is input to the image forming apparatus, the data is directly stored.

An image-formed sheet counter 213c counts the number of paper sheets on which images are formed by the image forming apparatus. The image-formed sheet counter 213c is reset to zero at the time of power-on or when an image forming condition such as density adjustment is updated after the number of sheets reaches a predetermined value (in this example, 500). A density control timing flag 213d indicates execution of density control. The density control timing flag 213d is set at the time of power-on or at the density control timing after the number of sheets reaches a predetermined value (in this example, 500).

Figure 8:
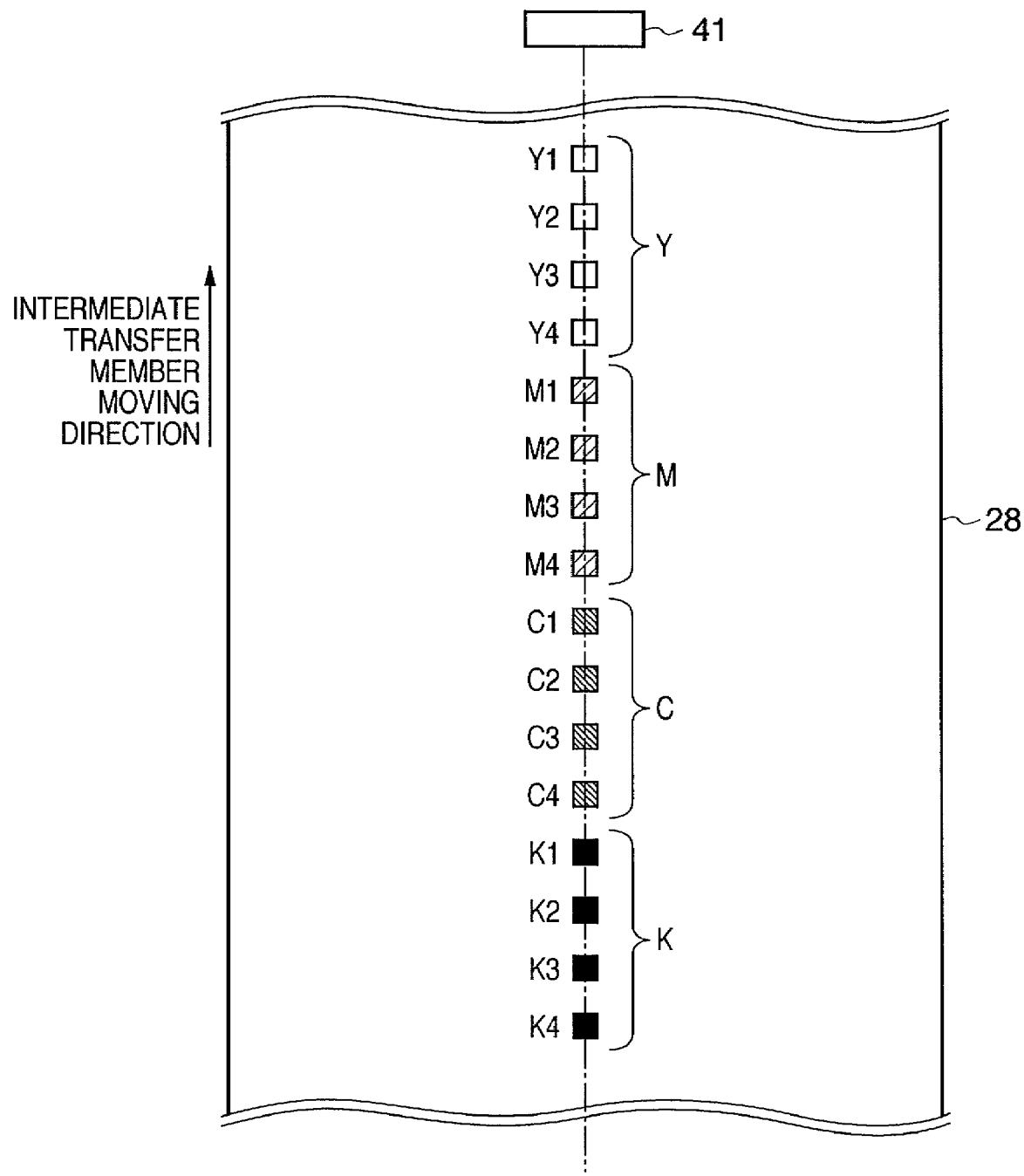
FIG. 8 is a view showing an example of the array of toner patches according to the embodiment.

An area 213e stores the density value of a toner patch of each color, which is output from the density sensor 41 of the image forming unit 100 in density control. This area stores the density values of toner patches of four tones for each color, as shown in FIG. 8. An area 213f stores the calculation value of the developing voltage value of each color, which is determined by the above-described method on the basis of the density values of the toner patches of each color. The developing voltage value of each color is stored until the next density control timing, or stored and saved in the external storage unit 214.

A program load area 213g loads a program stored in the external storage unit 214 to cause the CPU 211 to execute it.

The external storage unit 214 stores the following data and programs to implement the embodiment.

A threshold value 214a (in this embodiment, the number of sheets with images formed, i.e., 500) is a value to monitor and determine the density control timing. A density control pattern 214b is a pattern shown in FIG. 7 to be described later. A total of 16 patterns of four tones are stored simultaneously for each color.

A save area 214c stores the developing voltage values 213f on the RAM 213 and is held even after power-off. Parameters 214d are parameters for registration correction of the respective colors. The parameters will be described later in detail with reference to FIG. 10.

An image forming control program 214e controls image formation by the image forming apparatus. A density control program 214f executes density control at the density control timing. A registration correction program 214g executes registration correction of the respective colors by using the registration correction parameters 214d. A registration correction parameter generation program 214h generates the registration correction parameters of the respective colors. The registration correction parameter generation program 214h is not indispensable and need not always be stored if the parameters are generated only in manufacturing the image forming apparatus.

An input interface 215 interfaces input data from an external device. In this example, print data, input information from an operation unit, statuses from the image forming unit 100, and the output value of the density sensor 41 as one of the statuses are input. An output interface 216 interfaces output data to an external device. In this example, pixel data to the image forming unit 100, output information to the operation unit, and control signals to the image forming unit 100 are output.

Example of Operation of Image Processing Unit 200

Figure 6:
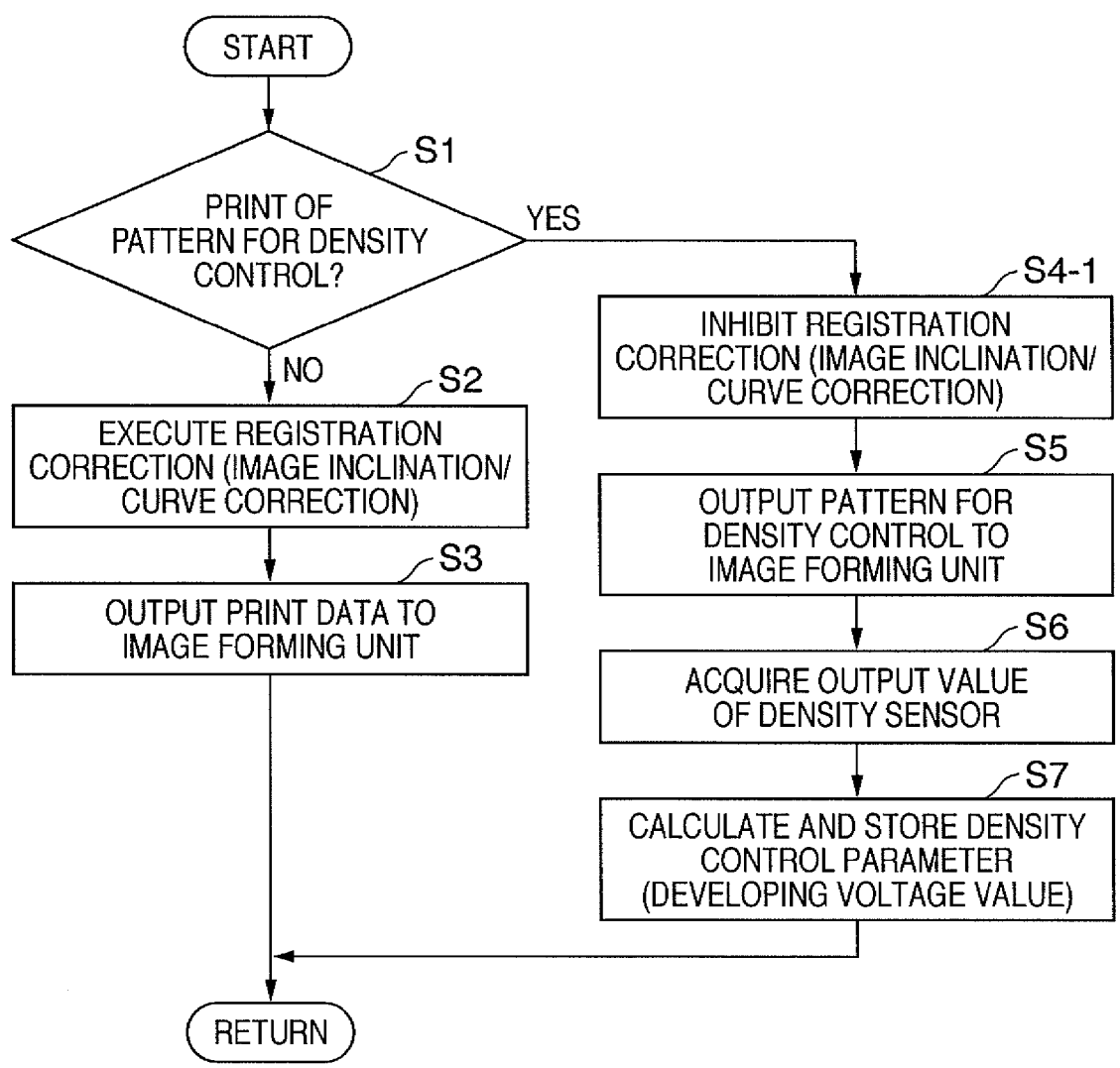
FIG. 6 is a flowchart illustrating registration correction switching discrimination in an image forming process according to the first embodiment.

FIG. 6 is a flowchart illustrating an example of the operation procure of the image processing unit 200 according to this embodiment. FIG. 6 shows the characteristic feature of this embodiment, i.e., a registration correction (image inclination/curve correction) switching discrimination process. The switching discrimination is done in every image formation.

First, in step S1, it is discriminated whether the image to be printed is a toner pattern for image density control or another image (for example, normal print image). In FIG. 6, image density control is discriminated on the basis of image data. However, since image density control is done at the time of power-on or upon determining that image formation has been done on 500 sheets, as described above, the process may branch based on a flag that stores the determination result.

If it is discriminated in step S1 that the image to be printed is an image (for example, normal print image) except a toner pattern for image density control, registration correction (image inclination/curve correction) is executed in step S2. When correction is executed, the positions of images of four colors (Y, M, C, and K) are aligned. It is therefore possible to obtain a satisfactory color image (superimposed image of Y, M, C, and K) without out of color registration.

In step S3, the print data whose out of color registration is eliminated by correcting the image forming positions is output to the image forming unit 100.

If it is discriminated in step S1 that the image to be printed is a toner pattern image for image density control, registration correction (image inclination/curve correction) is inhibited in step S4-1. This prevents the image pattern from having an uneven density caused by registration correction (image inclination/curve correction) and achieves satisfactory image density control. In this case, the four colors (Y, M, C, and K) have a registration error. However, no problem is posed because the image density control pattern includes only single-color images.

In step S5, the toner pattern image for image density control without registration correction is output to the image forming unit 100.

After that, in step S6, an output value corresponding to the toner pattern image for image density control is acquired from the density sensor 41. In step S7, a density control parameter is calculated on the basis of the acquired output value and stored for the subsequent process. The density control parameter calculation will be described later.

The registration correction (image inclination/curve correction) switching discrimination as the characteristic feature of this embodiment has been described above. The process in FIG. 6 forms a part of the image forming control program 214*e*. The process in steps S5 to S7 corresponds to the density control program 214*f*. The process in step S2 corresponds to the registration correction program 214*g*.

Example of Image Density Control of Embodiment

The method of image density control of this embodiment, which is executed in step S5 to S7 in FIG. 6, will be described next. In this embodiment, image density control is executed when the main body is powered on and every time 500 sheets are printed.

Figure 7:
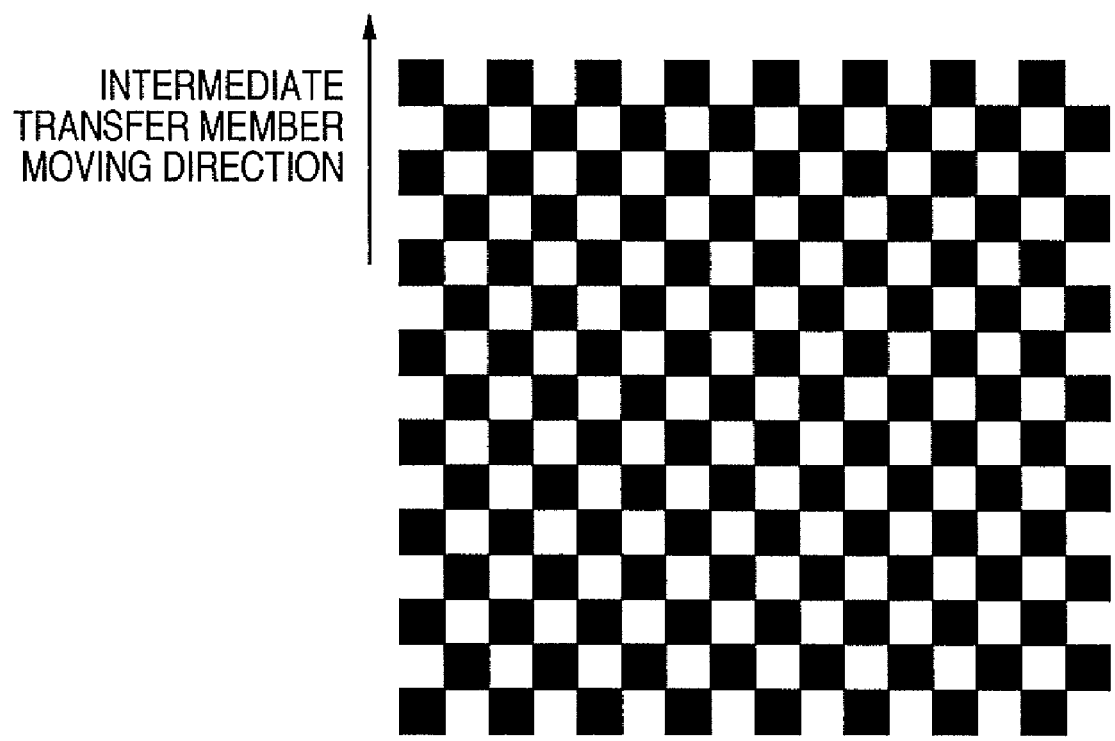
FIG. 7 is a view showing an example of a toner patch pattern according to the embodiment.

FIG. 7 shows toner patch pattern used for image density control.

In this example, as the pattern for image density control, a 1-dot 1-space checkered high density pattern including a larger number of lines than those in normal print image formation is used so that the density sensitively changes in response to the factors of density fluctuation.

FIG. 8 is a view showing the layout of toner patches formed on the intermediate transfer member 28.

At the portion where the density sensor 41 is arranged, a total of 16 8-mm square rectangular patches (four patches per color) each having the pattern shown in FIG. 7 are formed at an interval of 12 mm while changing the image forming condition in four steps for each of Y, M, C, and K. The image forming condition to be changed in this embodiment is the developing voltage value applied to the sleeves 26YS, 26MS, 26CS, and 26KS in the developers 26Y, 26M, 26C, and 26K. The developing voltage value is set to −150 V for patches Y1, M1, C1, and K1, −200 V for patches Y2, M2, C2, and K2, −250 V for patches Y3, M3, C3, and K3, and −300 V for patches Y4, M4, C4, and K4.

The density sensor 41 detects the density of each toner patch. A detection signal of the density sensor 41 is converted into a density by a conventionally known method using a detection signal-to-density conversion table (density conversion table).

Figure 9:
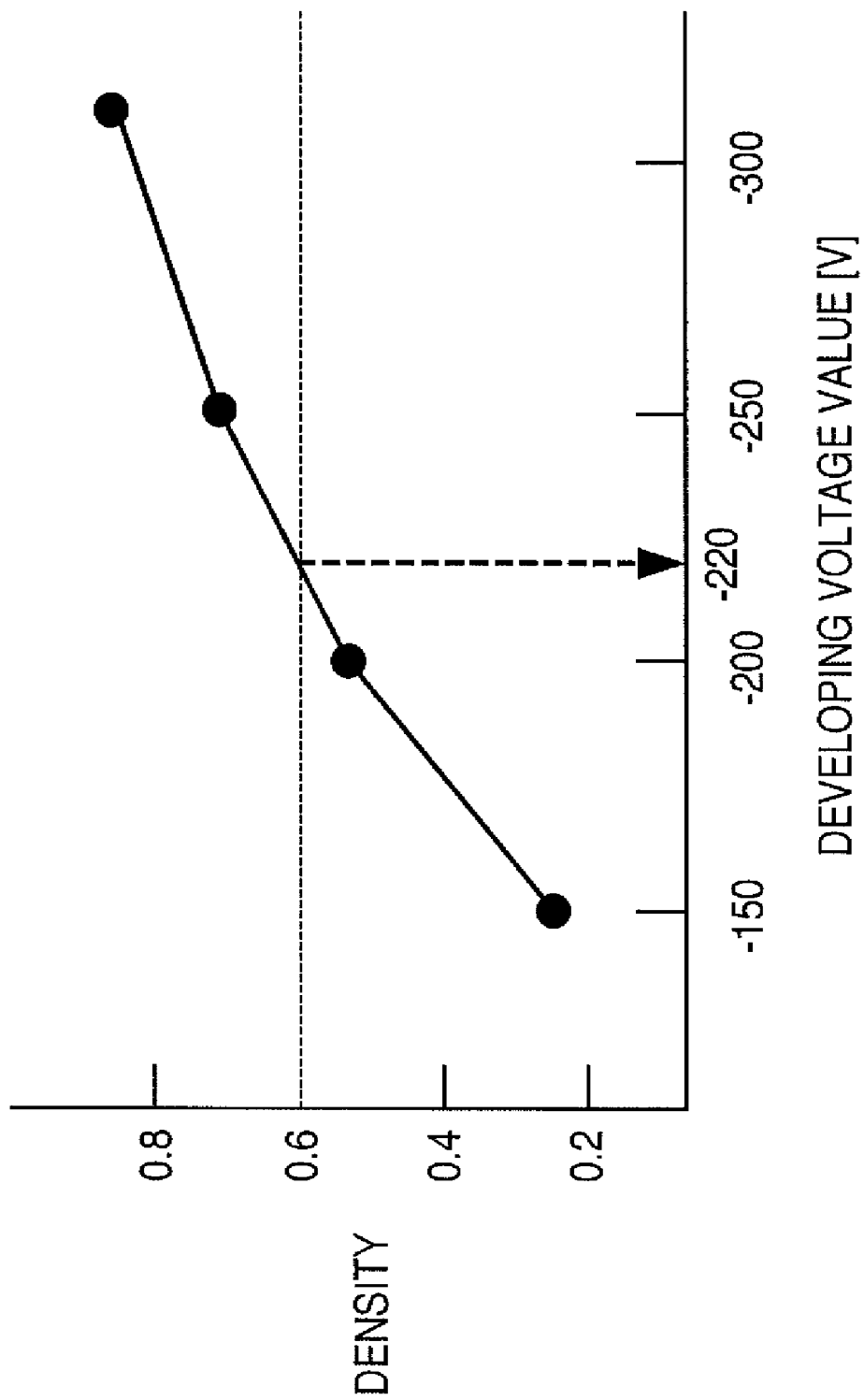
FIG. 9 is a graph for explaining an example of tone value conversion correction coefficient calculation according to the embodiment.

FIG. 9 shows an example of a density detection result. FIG. 9 shows a result for one color. The result in FIG. 9 is obtained for each of Y, M, C, and K.

In this embodiment, the density target value (adequate density value) of the patch pattern is set to 0.6. A developing voltage estimated to be closest to this value is set as the developing bias in printing. In this example, four reflection density data indicated by filled circles in FIG. 9 were obtained. The developing voltage corresponding to the reflection density of 0.6 exists between −200 V and −250 V. Assuming that the developing voltage and image density approximately have a proportional relationship in this section, the image density is estimated to be 0.6 when the developing voltage is about −220 V. Hence, in this example, the developing voltage is set to −220 V as the image forming condition for the subsequent process. This calculation is executed for each of Y, M, C, and K to determine an optimum developing voltage value for each color.

The image density control method of this embodiment has been described above.

Example of Registration Correction of Embodiment

A method of registration correction (image position correction for correcting an inclination or curve of an image in the main scanning direction) of the embodiment in step S2 in FIG. 6 will be described next with reference to FIG. 10.

In the process of manufacturing the image forming apparatus of this embodiment, the registration error amount is measured in each apparatus, and a registration error correction amount Δy to cancel the registration error amount is obtained in advance. The method of acquiring the registration error correction amount Δy is not limited to this. For example, it may be acquired on the basis of a detection result of a detection pattern for registration, which is formed on the intermediate transfer member or the like and detected by a registration detection sensor. Alternatively, the image forming apparatus is caused to output a chart for registration error measurement, and the image of the chart is converted into electronic information by, e.g., a commercially available scanner. The registration error correction amount Δy may be calculated from this information.

Figure 10:
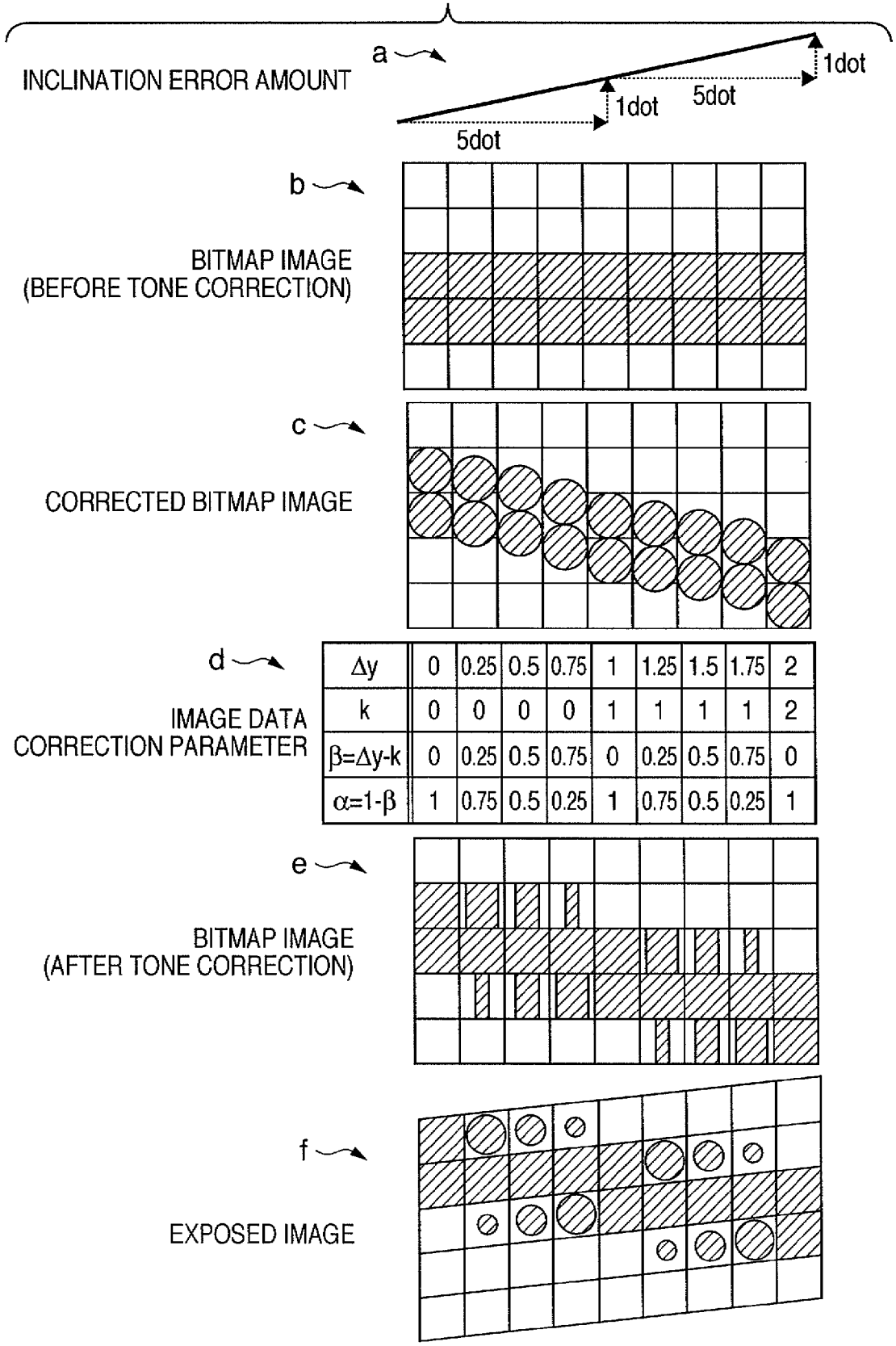
FIG. 10 is a view for explaining an example of registration error correction according to the embodiment.

In FIG. 10, an arrow-a indicates a scanning line that inclines to the upper right side. In this example, an inclination of 1 dot occurs every 5 dots in the main scanning direction of the exposure unit. In FIG. 10, an arrow-b indicates a bitmap image of a horizontal line before tone value conversion which has a width of 2 dots. In FIG. 10, an arrow-c indicates a correction image for the arrow-b in FIG. 10, which cancels a registration error caused by the inclination of the scanning line of the arrow-a in FIG. 10. To implement the correction image of the arrow-c in FIG. 10, the image data of the preceding and subsequent pixels in the sub-scanning direction are adjusted.

In FIG. 10, an arrow-d indicates a table representing the relationship between the registration error correction amount Δy and a tone value conversion parameter. In the table, k is the integer part (the fractional part is discarded) of the registration error correction amount Δy and represents the pixel-by-pixel correction amount in the sub-scanning direction. In the pixel-by-pixel correction, each pixel is offset in the sub-scanning direction in accordance with the correction amount.

On the other hand, β and α are image data distribution ratios to be used in executing correction in an amount smaller than a pixel in the sub-scanning direction and represent the distribution ratios of the tone values of the preceding and subsequent pixels in the sub-scanning direction based on the information of the fractional part of the registration error correction amount $\Delta y$. They are calculated by $\beta=(\Delta y-k)$, and $\alpha=(1-\beta)$, where $\alpha$ is the distribution ratio of the preceding pixel, and $\beta$ is the distribution ratio of the subsequent pixel. These data are stored as the registration correction parameters 214*d*.

In FIG. 10, an arrow-e indicates a bitmap image obtained by executing tone value conversion of the preceding and subsequent pixels in the sub-scanning direction according to the image correction parameters of the arrow-d in FIG. 10. In FIG. 10, an arrow-f indicates the exposed image, on the image carrier, of the bitmap image after tone value conversion. The inclination of the main scanning line is canceled, and a horizontal line is formed.

The registration error correction method of this embodiment has been described above in detail.

With the above arrangement and operation, in this embodiment, electrical registration error correction is inhibited when a toner image for detection to be used for image density control is to be formed. The method of stabilizing the result of image density control and preventing fluctuations of the density of a printed image in this way has been described.

Second Embodiment

In this embodiment, within a toner image pattern for detection to be used for image density control, image position correction is done using the same coordinate conversion value. A method of stabilizing the result of image density control and preventing fluctuations of the density of a printed image in this way will be described.

The overall arrangement, registration error correction method, and image forming condition calculation method for image density control of an image forming apparatus used in this embodiment are the same as those of the image forming apparatus described in the first embodiment, and a description thereof will not be repeated.

Figure 11:
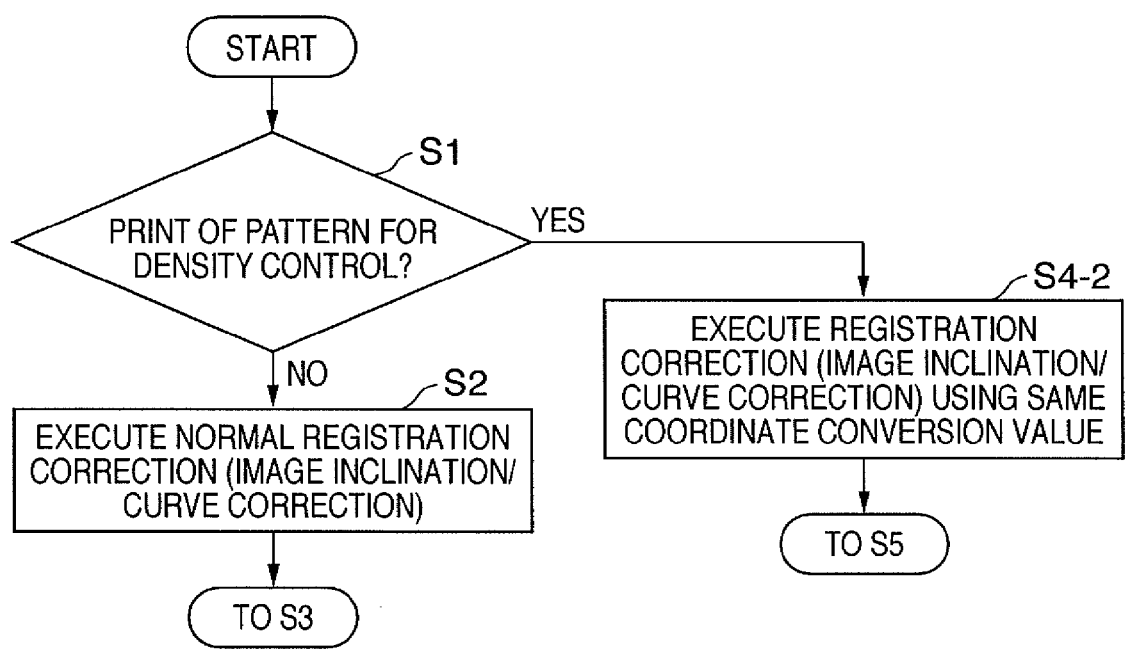
FIG. 11 is a flowchart illustrating registration correction switching discrimination in an image forming process according to the second embodiment.

The second embodiment is different from the first embodiment only in registration correction switching discrimination, and its method will be described below with reference to the flowchart in FIG. 11.

The correction switching discrimination is done in every image formation, as in the first embodiment.

First, in step S1, it is discriminated whether the image to be printed is a toner pattern for image density control or another image (e.g., normal print image). In FIG. 11, image density control is discriminated on the basis of image data. However, as in the first embodiment, since image density control is done at the time of power-on or upon determining that image formation has been done on 500 sheets, the process may branch based on a flag that stores the determination result.

If it is discriminated in step S1 that the image to be printed is an image (e.g., normal print image) except a toner pattern for image density control, registration correction (image inclination/curve correction) is executed in step S2. When correction is executed, the positions of images of four colors (Y, M, C, and K) are aligned. It is therefore possible to obtain a satisfactory color image (superimposed image of Y, M, C, and K) without out of color registration. The process advances to step S3.

If it is discriminated in step S1 that the image to be printed is a toner pattern image for image density control, registration correction (image inclination/curve correction) is executed using the same coordinate conversion value in step S4-2. In this embodiment, an integer part k (the fractional part is discarded) of a registration error correction amount $\Delta y$ calculated for the pattern write position (the left end of the pattern) is used as the coordinate conversion value of the toner pattern image. After that, steps S5 to S7 in FIG. 6 are executed.

That is, in this embodiment, within the image pattern for image density control, only pixel-by-pixel correction in the sub-scanning direction is performed by using the same correction amount (coordinate conversion value). This prevents the image pattern from having an uneven density caused by registration correction (image inclination/curve correction) and achieves satisfactory image density control.

The registration correction (image inclination/curve correction) switching discrimination as the characteristic feature of this embodiment has been described above.

As described above, within a toner image pattern for detection to be used for image density control, image position correction is done using the same coordinate conversion value. The method of stabilizing the result of image density control and preventing fluctuations of the density of a printed image in this way has been described.

Third Embodiment

In this embodiment, a vertical line pattern is used as a toner image pattern for detection to be used for image density control. A method of stabilizing the result of image density control and preventing fluctuations of the density of a printed image in this way will be described.

The overall arrangement, registration error correction method, and image forming condition calculation method for image density control of an image forming apparatus used in this embodiment are the same as those of the image forming apparatus described in the first embodiment, and a description thereof will not be repeated.

In the third embodiment, registration correction (image inclination/curve correction) switching determination is not performed, unlike the first and second embodiments. That is, the registration correction (image inclination/curve correction) is done for all images (including a toner image pattern for detection).

As the characteristic feature of this embodiment, a vertical line pattern is used as a toner patch pattern for image density control.

Figure 12:
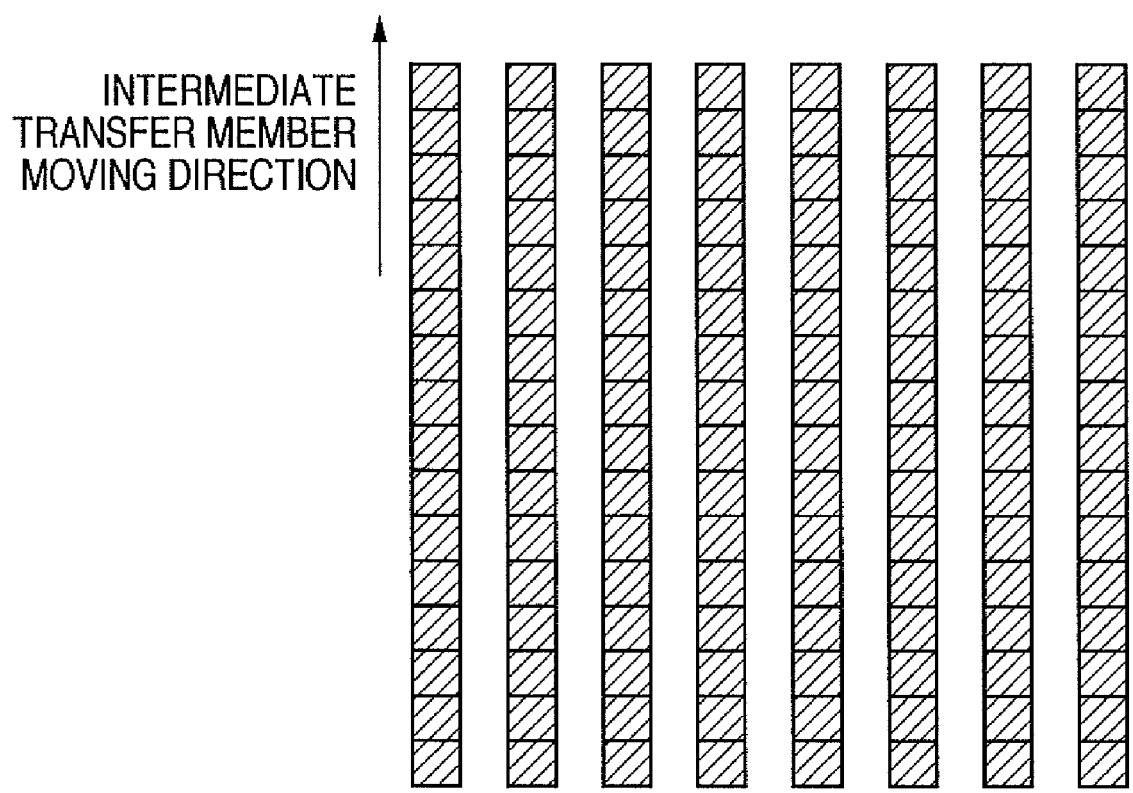
FIG. 12 is a view showing an example of a toner patch pattern according to the third embodiment.
Figure 13:
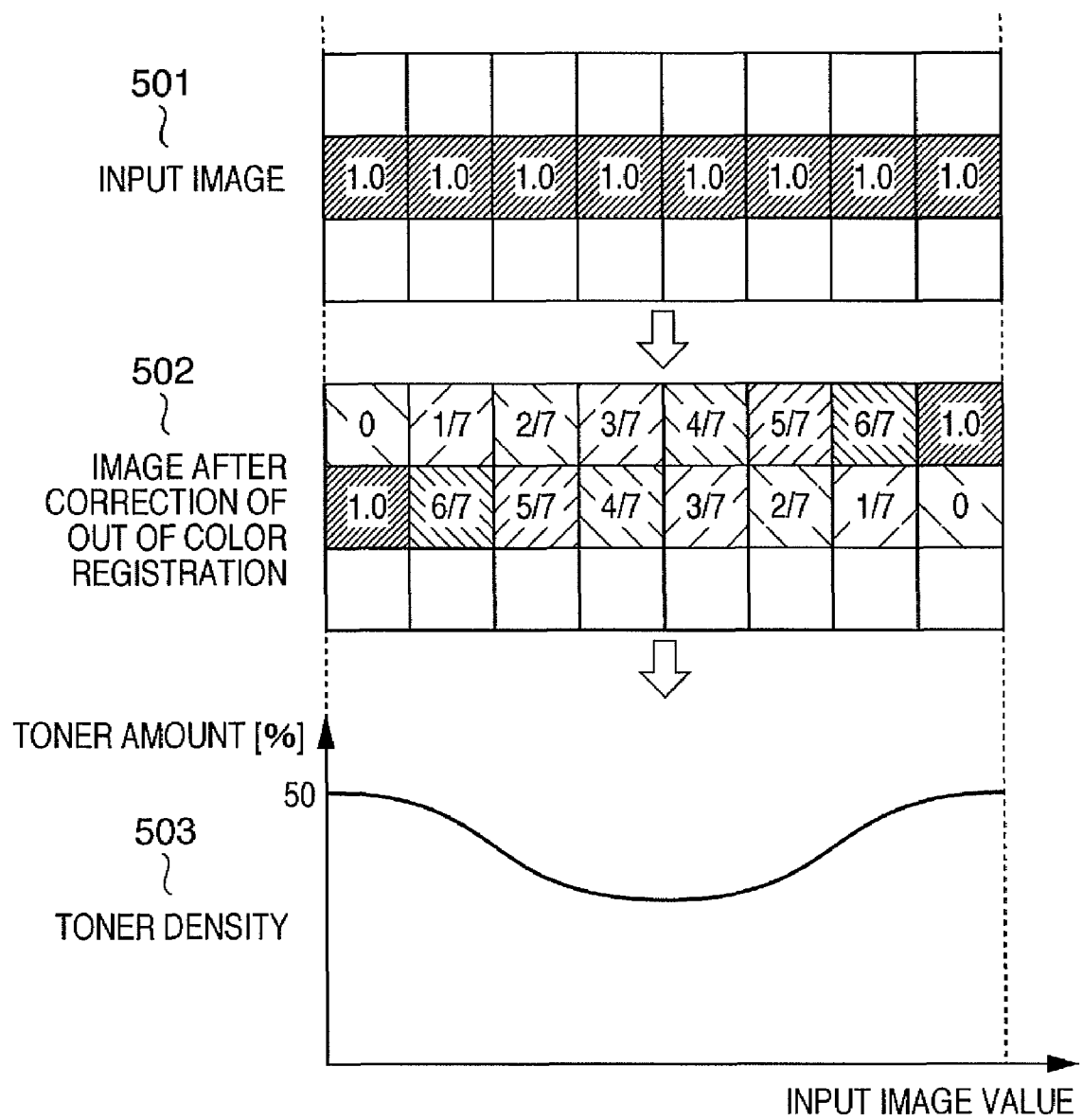
FIG. 13 is a view for explaining occurrence of an uneven density in a high density image.

The toner patch pattern for image density control used in this embodiment will be described below with reference to FIG. 12. In this embodiment, a 1-dot 1-space vertical line high density pattern including a larger number of lines than in normal print image formation is used so that the density sensitively changes in response to the factors of density fluctuation. In this pattern (vertical line pattern), the dot layout in the pattern does not change even when registration correction (image inclination/curve correction) is executed because it has the same pattern in the sub-scanning direction. That is, this prevents the image pattern from having an uneven density caused by registration correction (image inclination/curve correction) and achieves satisfactory image density control.

In this embodiment, a 1-dot 1-space vertical line high density pattern is used as a toner patch pattern. The patch pattern need only have a vertical linear shape and can be any other pattern such as a 2-dot 2-space pattern. A vertical line pattern optimum for the image forming apparatus to which the present invention is applied is selected.

In this embodiment, a vertical line pattern is used as a toner image pattern for detection to be used for image density control. The method of stabilizing the result of image density control and preventing fluctuations of the density of a printed image in this way has been described.

In the first and second embodiments, a method of switching registration correction for correcting an inclination or curve of an image in accordance with a toner patch image for density control has been described. However, it does not matter whether registration correction such as image position correction for shifting an entire image in the sub-scanning direction or image magnification correction in the main scanning direction is executed or not. Registration correction except image inclination/curve correction does not cause an uneven density in an image. For this reason, the presence/absence of these correction processes is irrelevant to the gist of the present invention and does not limited the scope of the present invention.

The present invention is also applicable to a system or integrated apparatus including a plurality of devices (e.g., host computer, interface device, and printer) or an apparatus including a single device.

The object of the present invention is achieved even by supplying a storage medium (or recording medium) which records software program codes for implementing the functions of the above-described embodiments to the system or apparatus and causing the computer (or CPU or MPU) of the system or apparatus to read out and execute the program codes stored in the storage medium.

In this case, the program codes read out from the storage medium implement the functions of the above-described embodiments by themselves, and the storage medium which stores the program codes constitutes the present invention.

The functions of the above-described embodiments are implemented not only when the computer executes the readout program codes but also when the operating system (OS) running on the computer partially or wholly executes actual processing on the basis of the instructions of the program codes.

Alternatively, the program codes read out from the storage medium are written in the memory of a function expansion card inserted into the computer or a function expansion unit connected to the computer. The CPU of the function expansion card or function expansion unit partially or wholly executes actual processing on the basis of the instructions of the program codes. The functions of the above-described embodiments are also achieved by this processing.

The storage medium to which the present invention is applied stores program codes corresponding to the above-described flowcharts.

As described above, in the above-described embodiments, in an image forming apparatus for executing electrical registration error correction, it is possible to prevent fluctuations of the density of a formed image by stabilizing the result of image density control.

More specifically, it is possible to stabilize the result of image density control and prevent fluctuations of the density of a printed image by the following control.

When a toner image for detection to be used for image density control is to be formed, electrical registration error correction is inhibited.

Alternatively, the same coordinate conversion value is used within the toner image pattern for detection to be used for image density control.

Alternatively, a vertical line pattern is used as the toner image pattern for detection to be used for image density control.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-056374, filed Mar. 6, 2007, which is hereby incorporated by reference herein in its entirety.

What is claimed is:

1. An image forming apparatus comprising:
an image forming position correction unit adapted to correct an image forming position in an amount smaller than one pixel in a sub-scanning direction by adjusting a density of a pixel in the sub-scanning direction for each position in a main scanning direction in order to correct an inclination or curve of the image;
an image forming condition correction unit adapted to form a toner image for detection on an image carrier, cause an optical sensor to detect an amount of light reflected by the toner image for detection, and determine an image forming condition on the basis of a detection result by the optical sensor;
a discriminator adapted to discriminate whether image formation is normal image formation for image formation on a printing medium or image formation of the toner image for detection by the image forming condition correction unit; and
a controller adapted to control the image forming apparatus so as to correct an image forming position in the amount smaller than one pixel in the sub-scanning direction by using the image forming position correction unit in a case in which the discriminator has discriminated that the image formation is the normal image formation, but so as not to correct the image forming position in the amount smaller than one pixel in the sub-scanning direction by using the image forming position correction unit in a case in which the discriminator has discriminated that the image formation is of the toner image for detection.

2. The apparatus according to claim 1, wherein the controller controls the image forming apparatus so as to correct the image forming position in the amount smaller than one pixel in the sub-scanning direction by using the image forming position correction unit in the case in which the discriminator has discriminated that the image formation is the normal image formation, but so as to correct the image forming position using a same coordinate conversion value in the sub-scanning direction within a pattern of the toner image for detection in the case in which the discriminator has discriminated that the image formation is of the toner image for detection.

3. The apparatus according to claim 2, wherein a position correction of the image forming position by the image forming position correction unit includes a first position correction in which a position of a pixel in the sub-scanning direction is converted pixel by pixel, and a second position correction in which a density of a pixel in the sub-scanning direction is adjusted in the amount smaller than one pixel, and the position correction using the same coordinate conversion value in the sub-scanning direction is the first position correction.

4. The apparatus according to claim 1, wherein the controller controls the image forming apparatus do as to correct the image forming position in the amount smaller than one pixel in the sub-scanning direction by using the image forming position correction unit in the case in which the discriminator has discriminated that the image formation is the normal image formation, but so as to form the toner image for detection having a line pattern in the sub-scanning direction in the case in which the discriminator has discriminated that the image formation is of the toner image for detection.

5. The apparatus according to claim 1, wherein the image forming condition determined by the image forming condition correction unit includes a developing voltage value of each color.

6. A method of controlling an image forming apparatus comprising the steps of:
- an image forming position correction step for correcting an image forming position in an amount smaller than one pixel in a sub-scanning direction by adjusting a density of a pixel in the sub-scanning direction for each position in a main scanning direction in order to correct an inclination or curve of the image;
- a discriminating step for discriminating whether image formation is normal image formation for image formation on a printing medium or image formation of a toner image for detection on an image carrier of the image forming apparatus, the toner image for detection being used to determine an image forming condition by detecting an amount of light reflected by the toner image for detection using an optical sensor; and
- a control step for performing a correction of the image forming position in the amount smaller than one pixel in the sub-scanning direction at the image forming position correction step in a case in which the image formation is discriminated as the normal image formation in the discriminating step, but not performing the image forming position correction step in a case in which the image formation is discriminated as image formation of the toner image for detection in the discriminating step.

7. The method according to claim 6, wherein, in the control step, the correction of the image forming position in the amount smaller than one pixel in the sub-scanning direction at the image forming position correction step is performed in the case in which the image formation is discriminated as the normal image formation in the discriminating step, but a correction of the image forming position using a same coordinate conversion value in the sub-scanning direction within a pattern of the toner image for detection is performed in the case in which the image formation is discriminated as image formation of the toner image for detection in the discriminating step.

8. The method according to claim 7, wherein the correction of the image forming position at the image forming position correction step includes a first position correction in which a position of a pixel in the sub-scanning direction is converted pixel by pixel, and a second position correction in which a density of a pixel in the sub-scanning direction is adjusted in the amount smaller than one pixel, and the position correction using the same coordinate conversion value in the sub-scanning direction is the first position correction.

9. The method according to claim 6, wherein, in the control step, the correction of the image forming position in the amount smaller than one pixel in the sub-scanning direction at the image forming position correction step is performed in the case in which the image formation is discriminated as the normal image formation in the discriminating step, but the toner image for detection having a line pattern in the sub-scanning direction is formed in the case in which the image formation is discriminated as image formation of the toner image for detection in the discriminating step.

10. The method according to claim 6, wherein the image forming condition includes a developing voltage value of each color.

11. A computer program stored in a non-transitory computer-readable storage media for causing a computer to perform the method according to claim 6.

12. A non-transitory computer-readable storage media having computer program for causing a computer to perform the method according to claim 6.

* * * * *